United States Patent [19]

Cseh et al.

[11] 4,220,586
[45] Sep. 2, 1980

[54] HETERO-ARYL AZO ACYLAMINO SUBSTITUTED ACETO-ACETARYLIDE PIGMENTS

[75] Inventors: Georg Cseh, Arlesheim; Armand Rouèche, Bottmingen; Stefan Hari, Allschwil, all of Switzerland

[73] Assignee: Ciba-Geigy Corporation, Ardsley, N.Y.

[21] Appl. No.: 846,949

[22] Filed: Oct. 31, 1977

[30] Foreign Application Priority Data

Nov. 9, 1976 [CH] Switzerland ............... 14095/76

[51] Int. Cl.² .................... C09B 29/32; C09D 3/00; C09D 11/02; C09D 11/16
[52] U.S. Cl. .................... 260/157; 106/23; 106/288 Q; 106/300; 106/308 Q; 106/309; 260/152; 260/154; 260/155; 260/156; 260/158
[58] Field of Search ............... 260/158, 157, 156, 155, 260/154, 152

[56] References Cited

U.S. PATENT DOCUMENTS

| | | | |
|---|---|---|---|
| 2,908,678 | 10/1959 | Goebel et al. | 260/154 |
| 3,137,685 | 6/1964 | Buckley et al. | 260/155 |
| 3,828,019 | 8/1974 | Junker et al. | 260/157 |
| 3,956,266 | 5/1976 | Mory et al. | 260/155 X |
| 3,963,694 | 6/1976 | Mory et al. | 260/157 X |
| 3,985,725 | 10/1976 | Ribka et al. | 260/155 |
| 4,016,151 | 4/1977 | Lotsch | 260/154 |

FOREIGN PATENT DOCUMENTS

| | | | |
|---|---|---|---|
| 2423127 | 12/1974 | Fed. Rep. of Germany | 260/157 |
| 2329781 | 1/1975 | Fed. Rep. of Germany | 260/152 |
| 2507908 | 9/1976 | Fed. Rep. of Germany | 260/154 |
| 896472 | 5/1962 | United Kingdom | 260/155 |
| 1129849 | 10/1968 | United Kingdom | 260/154 |
| 1382205 | 1/1975 | United Kingdom | 260/154 |

*Primary Examiner*—Floyd D. Higel
*Attorney, Agent, or Firm*—Joseph F. DiPrima; Harry Falber

[57] ABSTRACT

A monoazo pigment of the formula

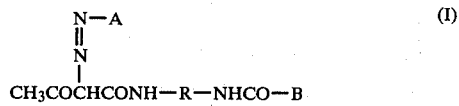

in which A is an aromatic radical containing a 5-membered or 6-membered hetero-ring which has a -CONH group bonded as part of the ring, R is an aromatic radical and B is a H atom, an alkoxy group having 1-4 C atoms, an aliphatic radical containing at most 6 C atoms, an aryl radical, an aralkyl group having 1-4 C atoms, an amino group, an alkylamino group or an arylamino group, which shows high tinctorial strength and good fastness to light, over-lacquering, migration, weathering and heat.

5 Claims, No Drawings

HETERO-ARYL AZO ACYLAMINO SUBSTITUTED ACETO-ACETARYLIDE PIGMENTS

The invention relates to monoazo pigments of the formula

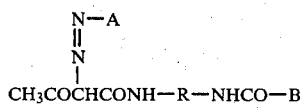

in which A is an aromatic radical containing a 5-membered or 6-membered hetero-ring which has a —CONH group bonded as part of the ring, R is an aromatic radical and B is a H atom, an alkoxy group having 1–4 C atoms, an aliphatic radical containing at most 6 C atoms, an aryl radical, an aralkyl group having 1–4 C atoms, an amino group, an alkylamino group or an arylamino group.

Compounds of particular interest are monoazo pigments of the formula

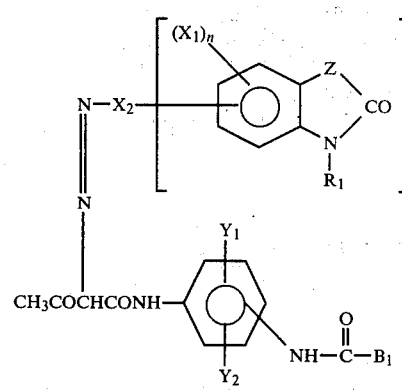

in which $R_1$ is a H atom, an alkyl group containing 1–4 C atoms or a phenyl radical, which is unsubstituted or substituted by halogen atoms or alkyl or alkoxy groups containing 1–4 C atoms, $X_1$ is a hydrogen or halogen atom, an alkyl or alkoxy group containing 1–4 C atoms or a phenoxy group, n is the number 1 or 2, $X_2$ is a direct bond or a phenylene group, Z is an O or S atom, the NH group or a group of the formula

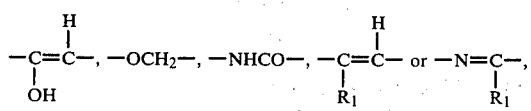

in which $R_1$ is as defined above, $Y_1$ is a H or halogen atom, an alkyl or alkoxy group containing 1–4 C atoms or an acetylamino group, $Y_2$ is a H or halogen atom or an alkyl or alkoxy group containing 1–4 C atoms and $B_1$ is a hydrogen atom, an alkyl or alkoxy group having 1–4 C atoms, a phenyl group which is unsubstituted or substituted by halogen atoms or alkyl or alkoxy groups having 1–4 C atoms, or a phenoxy group or a group of the formula —NHQ, in which Q is a hydrogen atom, an alkyl group containing 1–6 C atoms or a phenyl radical which is unsubstituted or substituted by halogen atoms or alkyl or alkoxy groups having 1–4 C atoms.

Preferred dyestuffs of the formula I are those in which R is a phenylene radical and in which the group NHCOB is in the m-position or especially the p-position relative to the acetoacetylamino group.

Particularly preferred pigments are those of the formula

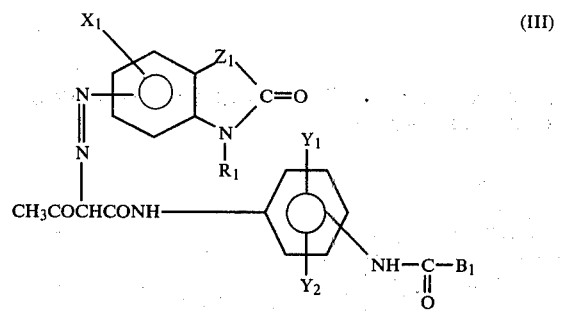

in which $X_1$, $Y_1$, $Y_2$ and $B_1$ are as defined and $Z_1$ is the NH group or the group of the formula

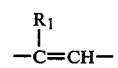

in which $R_1$ is as defined, and especially those of the formula

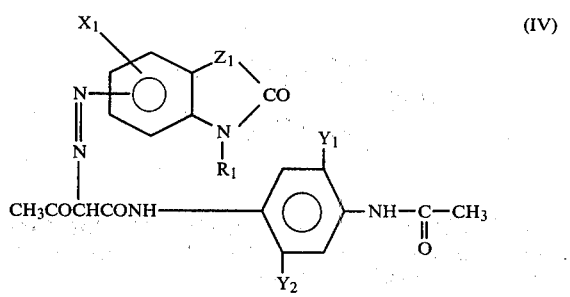

in which $R_1$, $X_1$, $Y_1$, $Y_2$ and $Z_1$ are as defined.

The pigments according to the invention are obtained when a diazonium salt of an amine of the formula $A—NH_2$, in which A is as defined above, is coupled with an acetoacetylamine of the formula

Amines of the formula

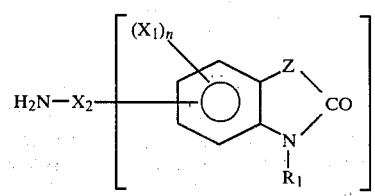

in which $R_1$, $X_1$, $X_2$, Z and n are as defined, are preferably used as the diazo component.

Particularly preferred diazo components are those of the formula

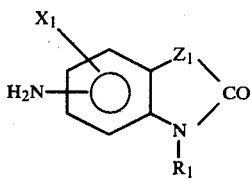

in which $R_1$, $X_1$ and $Z_1$ are as defined, and especially those of the formulae

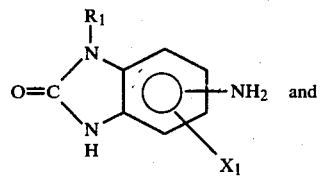

in which $R_1$ and $X_1$ are as defined and $X_2$ is H, Cl, $CH_3$ or $OCH_3$.

Further diazo components which are of interest are quinazolones of the formula

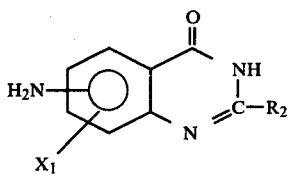

in which $X_1$ is as defined and $R_2$ is a H atom, a hydroxyl group or an alkyl group containing 1–4 carbon atoms, especially the quinazolone of the formula

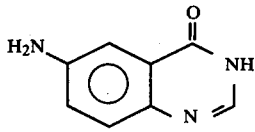

and also phenmorpholones of the formula

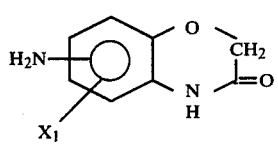

in which $X_1$ is as defined.

Examples which may be mentioned are: 5-amino-benzimidazol-2-one, 5-amino-1-methyl-benzimidazol-2-one, 5-amino-1-n-butyl-benzimidazol-2-one, 5-amino-1-phenyl-benzimidazol-2-one, 5-amino-1-p-chlorophenyl-benzimidazol-2-one, 5-amino-1-p-methylphenyl-benzimidazol-2-one, 5-amino-1-p-methoxyphenylbenzimidazol-2-one, 5-amino-6-chloro-benzimidazol-2-one, 5-amino-6-bromo-benzimidazol-2-one, 5-amino-6-methyl-benzimidazol-2-one, 5-amino-6-methoxy-benzimidazol-2-one, 6-amino-benzoxazol-2-one, 5-amino-benzoxazol-2-one, 5-amino-7-chloro-benzoxazol-2-one, 6-amino-5-chloro-benzoxazol-2-one, 6-amino-5-methyl-benzoxazol-2-one, 6-amino-5-chloro-benzthiazol-2-one, 6-amino-5-methyl-benzthiazol-2-one, 6-amino-quinazol-4-one, 6-amino-2-methyl-quinazol-4-one, 6-amino-2-methoxy-quinazol-4-one, 6-amino-7-chloro-2-methyl-quinazol-4-one, 7-amino-quinazol-4-one, 6-amino-2,4-dihydroxyquinazoline, 7-amino-phenmorphol-3-one, 6-amino-phenmorphol-3-one, 7-amino-6-chloro-phenmorphol-3-one, 7-amino-6-methyl-phenmorphol-3-one, 7-amino-6-methoxy-phenmorphol-3-one, 6-amino-quinol-2-one, 6-amino-4-methyl-quinol-2-one, 7-amino-4-methyl-quinol-2-one, 7-amino-4,6-dimethylquinol-2-one, 6-amino-7-chloro-4-methyl-quinol-2-one, 7-amino-4-methyl-6-methoxy-quinol-2-one, 6-amino-1,3-dihydroxy-isoquinoline, 6-amino-2,4-dihydroxy-quinoline and 6-amino-2,3-dihydroxyquinoxaline.

The diazo components mentioned are known compounds.

Diazotisation is effected by known methods.

In the coupling components, B is preferably an alkyl or alkoxy radical having 1–3 C atoms, a phenyl group which is unsubstituted or substituted by halogen atoms or alkyl or alkoxy groups, or a phenoxy group, and the group —NHCOB is preferably in the m-position or especially the p-position relative to the acetoacetylamino group.

Coupling components of the formula

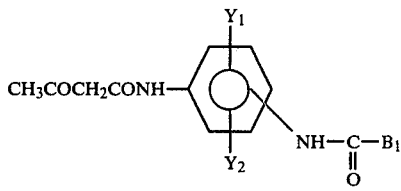

in which $B_1$, $Y_1$ and $Y_2$ are as defined, are preferably used.

Particularly preferred coupling components are those of the formula

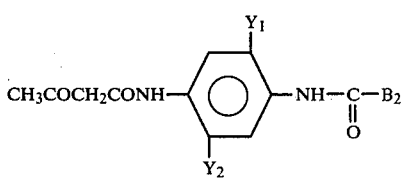

in which $Y_1$ and $Y_2$ are as defined and $B_2$ is $C_1$–$C_3$ alkyl, and especially those of the formula

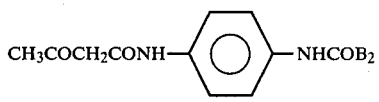

in which $B_2$ is as defined.

The coupling components are obtained in a simple manner by the action of diketene on the corresponding amines, for example 3-formylamino-aniline, 4-formylamino-aniline, 2-acetylamino-aniline, 3-acetylamino-aniline, 4-acetylaminoaniline, 3-acetylamino-6-chloro-aniline, 3-acetylamino-5-methyl-aniline, 3-acetylamino-6-methoxy-aniline, 3- acetylamino-6-chloro-4-methyl-aniline, 4-acetylamino-2-chloro-aniline, 4-acetylamino-3-chloro-aniline, 4-acetylamino-3-methyl-aniline, 4-acetylamino-3-methoxy-aniline, 4-acetylamino-2,5-dichloroaniline, 4-acetylamino-2,5-dimethyl-aniline, 4-acetylamino-2,5-dimethoxy-aniline, 4-acetylamino-2-chloro-5-methyl-aniline, 4-acetylamino-2-chloro-5-methoxy-aniline, 2-propionylaminoaniline, 3-propionylamino-aniline, 4-propionylamino-aniline, 3-propionylamino-6-methoxy-aniline, 4-propionylamino-2,5-dimethoxy-aniline, 2-benzoylamino-aniline, 3-benzoylaminoaniline, 4-benzoylamino-aniline, 4-benzoylamino-2,5-dichloroaniline, 4-benzoylamino-2,5-dimethyl-aniline, 3-chloroacetylamino-aniline, 4-chloroacetylamino-aniline, 4-chloroacetylamino-3-chloro-aniline, 4-chloroacetylamino-3-methyl-aniline, 4-chloroacetylamino-2,5-dichloro-aniline, 4-chloroacetylamino-2,5-dimethyl-aniline, 4-chloroacetylamino-2-chloro-5-methylaniline, 3-dichloroacetylamino-aniline, 4-dichloroacetylaminoaniline, 3-trichloroacetylamino-aniline, 4-trichloroacetylamino-aniline, 3-trifluoroacetylamino-aniline, 4-trifluoroacetylamino-aniline, 4-methoxyacetylamino-aniline, 3-phenylacetylamino-aniline, 4-phenylacetylamino-aniline, 3-α-chloropropionylamino-aniline, 4-α-chloropropionylamino-aniline, 3-β-chloropropionylamino-aniline, 4-β-chloropropionylamino-aniline, 4-β-chloropropionylamino-2-chloro-5-methyl-aniline, 4-α-phenoxypropionylamino-aniline, 4-β-phenoxypropionylamino-2,5-dimethyl-aniline, 3-aminophenylurea, 3-amino-4-methoxyphenylurea and N-(4-aminophenyl)-N'-phenylurea.

The coupling reaction preferably takes place in a weakly acid medium, appropriately in the presence of conventional agents which promote coupling. Agents of this type which may be mentioned are, especially, dispersing agents, for example aralkyl sulphonates, such as dodecyl benzenesulphonate, or 1,1'-dinaphthylmethane-2,2'-disulphonic acid or polycondensation products of alkylene oxides. The dispersion of the coupling component can also advantageously contain protective colloids, for example methylcellulose, or smaller amounts of inert organic solvents which are sparingly soluble or insoluble in water, for example aromatic hydrocarbons, which can be halogenated or nitrated, such as benzene, toluene, xylene, chlorobenzene, dichlorobenzene or nitrobenzene, as well as aliphatic halogenohydrocarbons, for example, carbon tetrachloride or trichloroethylene, and also water-miscible organic solvents, such as acetone, methyl ethyl ketone, methanol, ethanol or isopropanol or, preferably, dimethylformamide.

The coupling reaction can also advantageously be carried out by continuously combining an acid solution of the diazonium salt with an alkaline solution of the coupling component in a mixing jet, immediate coupling of the components taking place. Care must be taken that the diazo component and the coupling component are present in the mixing jet in equimolar amounts, and it proves advantageous to use a slight excess of the diazo component. This is most simply effected by monitoring the pH value of the liquid in the mixing jet. Provision must also be made for vigorous turbulence of the two solutions in the mixing jet. The resulting dye dispersion is withdrawn continuously from the mixing jet and the dye is separated off by filtration.

By virtue of the fact that they are insoluble, the resulting pigments can be isolated from the reaction mixtures by filtering off. It proves advantageous to subject the resulting pigments to an after-treatment with an organic solvent, preferably an organic solvent which boils above 100° C. Solvents which prove particularly suitable are benzenes substituted by halogen atoms or alkyl or nitro groups, such as toluene, xylene, chlorobenzene, o-dichlorobenzene or nitrobenzene, and pyridine bases, such as pyridine, picoline or quinoline, and also ketones, such as cyclohexanone, ethers, such as ethylene glycol monomethyl ether or ethylene glycol monoethyl ether, amides, such as dimethylformamide or N-methyl-pyrrolidone, sulpholane, dimethylsulphoxide or water on its own, under pressure if necessary. The after-treatment can also be carried out in water in the presence of organic solvents and/or with the addition of surface-active substances.

The after-treatment is preferably effected by heating the pigment in solvents to 100° to 150° C., if necessary in an autoclave, and in many cases an increase in the grain size takes place and this has a favourable effect on the covering power and on the fastness to light and migration and on the rheological properties of the resulting pigments.

Finally, coupling can also be effected by suspending the amine and the coupling component in a molar ratio of 1:1 in an organic solvent and treating the suspension with a diazotising agent, especially an ester of nitric acid, such as methyl nitrite, ethyl nitrite, butyl nitrite, amyl nitrite or octyl nitrite.

The novel dyes are valuable pigments which, in the finely divided form, can be used for pigmenting high-molecular organic material, for example cellulose ethers and cellulose esters, high molecular weight polyamides and high molecular weight polyurethanes or polyesters, acetylcellulose, nitrocellulose, natural resins or synthetic resins, such as polymerisation resins or condensation resins, for example aminoplasts, especially urea-/formaldehyde resins and melamine/formaldehyde resins, alkyd resins, phenoplasts, polycarbonates, polyolefines, such as polystyrene, polyvinyl chloride, polyethylene, polypropylene, polyacrylonitrile, polyacrylic acid esters, rubber, casein, silicone and silicone resins, on their own or as mixtures.

It is immaterial whether the high-molecular compounds mentioned are in the form of plastic compositions or melts or in the form of spinning solutions, lacquers, paints or printing inks. Depending on the intended use, it proves advantageous to use the novel pigments as toners or in the form of formulations.

In addition to the pure pigment, the formulations can also contain, for example, natural resins, for example abietic acid or esters thereof, ethylcellulose, cellulose acetobutyrate, alkaline earth metal salts of higher fatty acids, fatty amines, for example stearylamine or rosinamine, vinyl chloride/vinyl acetate copolymers, polyacrylonitrile or polyterpene resins, or water-soluble dyes, for example dye-sulphonic acids or the alkaline earth metal salts thereof.

The dyes according to the invention are distinguished by the fact that they are inexpensive and by a high tinctorial strength, good fastness to light, to over-lacquering, to migration and to weathering and by stability to heat. Compared with disazo pigments, they have the advantage that the after-treatment in organic solvents is not absolutely necessary in order to achieve a good texture and fastness to migration.

In the examples which follow, the parts, unless otherwise indicated, are parts by weight, the percentages are percentages by weight and the temperatures are given in degrees centigrade.

EXAMPLE 1

1.63 Parts of 5-amino-6-methyl-benzimidazol-2-one are diazotised at 5° in 50 parts by volume of ice-water with 2.5 parts by volume of concentrated hydrochloric acid. 5 Parts of crystalline sodium acetate are added to the resulting yellowish solution and the mixture is clarified by filtration. 2.34 parts of 4-acetoacetylamino-acetanilide in 3 parts by volume of 30% strength sodium hydroxide solution are then dissolved in 40 parts of water. The diazo solution is added dropwise at 5° and in the course of 15 minutes to the pale yellow solution. A yellow pigment suspension forms. The suspension is stirred for several hours more at 80°–90° and the pigment formed is filtered off, washed with hot water and dried. This gives 4 parts of a yellow pigment which, when milled into polyvinyl chloride, gives fast, yellow films of good tinctorial strength. When subjected to an after-treatment in dimethylformamide (5 hours at 160° C.), the pigment dyes polyvinyl chloride in a bright and deep yellow shade with very good fastness to migration and good fastness to light.

EXAMPLE 2

1.84 Parts of 5-amino-6-chloro-benzimidazol-2-one are diazotised according to Example 1 and the diazo compound is coupled with 4-acetoacetylamino-acetanilide. The resulting yellow pigment suspension is filtered and the pigment is washed with hot water. The moist filter cake is suspended in 100 parts of water, the suspension is stirred for 5 hours in an autoclave at 180° and after cooling to room temperature the product is filtered off and dried at 60° C. This gives 4.2 parts of a yellow pigment which dyes polyvinyl chloride in a bright and deep yellow shade with very good fastness to migration, heat, light and weathering.

EXAMPLE 3

1.74 Parts of 7-amino-4-methyl-quinol-2-one and 2.34 parts of 4-acetoacetylamino-acetanilide are dissolved in 100 parts by volume of ethylcellulose and 10 parts by volume of glacial acetic acid at 50° C. After the solution has been cooled to room temperature, 2.5 parts by volume of tert.-butyl nitrite in 50 parts by volume of ethylcellosolve are allowed to run in dropwise in the course of 15 minutes, the temperature rising to 40° C. and the pigment starting to form. Subsequently, the mixture is stirred for 2 hours at 40°–50° C. and for 18 hours at 130°–140° C. During this time, the dye assumes a uniformly crystalline form. Yellow crystalline aggregates 1–3μ in length are discerned under a microscope. The mixture is filtered at 140° C. and the material on the filter is washed with hot ethylcellosolve until the filtrate running off is colourless, the ethylcellosolve is then displaced by methanol and finally the product is washed with hot water. After drying, 4 parts of a yellow pigment are obtained.

The table which follows describes further dyes which are obtained by coupling the amine listed in column I with the acetoacetarylides of the amines in column II and subjecting the reaction product to an after-treatment with the solvents indicated in column III. Column IV indicates the colour shade of a PVC film coloured with 0.2% of these pigments.

| No. | I<br>Diazo component | II<br>Acetoacetyl compound of | III<br>After-treatment in | IV<br>Colour shade |
|---|---|---|---|---|
| 4 | 5-amino-benzimidazol-2-one | 4-acetylamino-aniline | ethylcellosolve | yellow |
| 5 | 6-amino-4-methyl-quinol-2-one | " | dimethylformamide | " |
| 6 | 7-amino-4,6-dimethyl-quinol-2-one | " | " | " |
| 7 | 7-amino-4,8-dimethyl-quinol-2-one | " | " | " |
| 8 | 6-amino-7-chloro-4-methyl-quinol-2-one | " | " | greenish-tinged yellow |
| 9 | 6-amino-quinazol-4-one | " | " | yellow |
| 10 | 7-amino-phenmorphol-3-one | " | ethylcellosolve | greenish-tinged yellow |
| 11 | 5-amino-benzimidazol-2-one | 4-propionyl-amino-aniline | dimethylformamide | reddish-tinged yellow |
| 12 | 5-amino-6-chloro-benzimidazol-2-one | 4-propionyl-amino-aniline | " | reddish-tinged yellow |
| 13 | 5-amino-6-methyl-benzimidazol-2-one | 4-propionyl-amino-aniline | " | reddish-tinged yellow |
| 14 | 6-amino-7-chloro-4-methyl-quinol-2-one | 4-propionyl-amino-aniline | " | yellow |
| 15 | 6-amino-quinazol-4-one | 4-propionyl-amino-aniline | dimethylformamide | greenish-tinged |
| 16 | 7-amino-phenmorphol-3-one | 4-propionyl-amino-aniline | " | yellow |
| 17 | 5-amino-6-chloro-benzimidazol-2-one | 4-chloroacetyl-amino-aniline | " | " |
| 18 | 1-methyl-5-amino-benzimidazol-2-one | 4-amino-phenyl-urea | " | reddish-tinged yellow |
| 19 | 5-amino-6-methyl-benzimidazol-2-one | 2-chloro-5-methoxy-4-acetylamino-aniline | " | reddish-tinged yellow |
| 20 | 7-amino-4-methyl-6-methoxy-quinol-2-one | 2-chloro-5-methoxy-4-acetylamino-aniline | " | reddish-tinged yellow |
| 21 | 7-amino-4-methyl-6-phenoxy-quinol-2-one | 2-chloro-5-methoxy-4-acetylamio-aniline | " | yellow |

-continued

| No. | I Diazo component | II Acetoacetyl compound of | III After-treatment in | IV Colour shade |
|---|---|---|---|---|
| 22 | 7-amino-6-methyl-phenmorpholone | 2-chloro-5-methoxy-4-acetylamino-aniline | " | " |
| 23 | 7-amino-6-chloro-4-methyl-quinol-2-one | 2,5-dimethoxy-4-acetylamino-aniline | " | reddish-tinged yellow |
| 24 | 5-amino-6-chloro-benzimidazol-2-one | 4-carboethoxy-amino-aniline | " | yellow |
| 25 | 5-amino-6-chloro-benzimidazol-2-one | 4-benzoyl-amino-aniline | o-dichlorobenzene | " |
| 26 | 7-amino-4,6-dimethyl-quinol-2-one | 4-benzoyl-amino-aniline | dimethylformamide | reddish-tinged yellow |
| 27 | 6-amino-7-chloro-4-methyl-quinol-2-one | " | o-dichlorobenzene | greenish-tinged yellow |
| 28 | 6-amino-quinazol-4-one | " | dimethylformamide | yellow |
| 29 | 7-amino-6-chloro-4-methyl-quinol-2-one | 4-formylamino-aniline | N-methyl-pyrrolidone | greenish-tinged yellow |
| 30 | 7-amino-4,6-dimethyl-quinol-2-one | " | N-methyl-pyrrolidone | yellow |
| 31 | 7-amino-6-methoxy-4-methyl-quinol-2-one | 4-acetylamino-2,5-dimethyl-aniline | N-methyl-pyrrolidone | " |
| 32 | 6-amino-quinazol-4-one | 4-acetylamino-2,5-dimethyl-aniline | dimethylformamide | greenish-tinged yellow |
| 33 | 6-amino-quinazol-4-one | 4-acetylamino-2-methyl-5-chloroaniline | " | greenish-tinged yellow |
| 34 | 6-amino-7-chloro-4-methyl-quinol-2-one | 4-acetylamio-2-methyl-5-chloro-aniline | N-methyl-pyrrolidone | yellow |
| 35 | 6-amino-7-chloro-4-methyl-quinol-2-one | 4-acetylamino-2,5-dichloro-aniline | o-dichlorobenzene | greenish-tinged yellow |
| 36 | 2-(4'-aminophenyl)-quinazol-4-one | 4-acetyl-amino-aniline | dimethylformamide | yellow |
| 37 | 6-amino-2,4-dihydroxy-quinoline | 4-acetyl-amino-aniline | " | greenish-tinged yellow |
| 38 | 6-amino-quinazol-4-one | 3,4-diacetyl-amino-aniline | " | greenish-tinged yellow |
| 39 | 7-amino-6-chloro-4-methyl-quinol-2-one | 3,4-diacetyl-amino-aniline | dimethylsulphoxide | greenish-tinged yellow |
| 40 | 5-amino-1-(meta-chlorophenyl)-benzimidazol-2-one | 3,4-diacetyl-amino-aniline | dimethylformamide | yellow |
| 41 | 5-amino-6-chloro-benzimidazolone | 4-butyryl-amino-aniline | dimethylformamide | yellow |

EXAMPLE 42

0.6 g of the pigment prepared according to Example 1 are mixed together with 67 g of polyvinyl chloride, 33 g of dioctyl phthalate, 2 g of dibutyl-tin dilaurate and 2 g of titanium dioxide and the mixture is processed on a roll mill for 15 minutes at 160° C. to give a thin film. The yellow coloration thus produced is deep and fast to migration and light.

EXAMPLE 43

1.00 g of the pigment prepared according to Example 1 is finely ground, on an Engelsmann grinding machine, with 4.00 g of a printing varnish having the composition: 29.4% of linseed oil stand oil (300 poise), 67.2% of linseed oil stand oil (20 poise), 2.1% of cobalt octoate (8% of Co) and 1.3% of lead octoate (24% of Pb), and is then printed in an amount of 1 g/m² on art paper with the aid of a block by the letterpress process. A deep, bright yellow shade of good transparency and good gloss is obtained. Very brilliant green shades can be produced by three-colour or four-colour printing by overprinting on blue.

The pigment is also suitable for other printing processes, such as gravure printing, offset printing and flexographic printing, and in these cases also gives very good results.

EXAMPLE 44

15 g of a collodion cotton containing 35% of butanol, 15 g of a phthalate resin modified with castor oil, 15 g of a 70% strength solution of a urea lacquer resin in butanol, 20 g of butyl acetate, 10 g of glycol monoethyl ether, 20 g of toluene and 5 g of alcohol are processed to a lacquer. The lacquer is then pigmented with 2 g of the dye according to Example 1 and 2 g of titanium dioxide (rutile) and ground. After spraying onto cardboard and drying the lacquer, a yellow coating with very good fastness to light, over-lacquering and weathering is obtained.

EXAMPLE 45

1 g of the dye according to Example 1 and 5 g of titanium dioxide are added to 100 g of a stoving lacquer which consists of 58.5 g of a 60% strength solution of a coconut alkyd resin in xylene, 23 g of a 65% strength solution of a melamine lacquer resin in butanol, 17 g of xylene and 1.5 g of butanol. The mixture is ground in a ball mill for 48 hours and the lacquer pigmented in this way is sprayed onto a cleaned metal surface. After stoving at 120°, a yellow coloration with good fastness to light, over-lacquering and weathering is obtained.

What is claimed is:
1. A monoazo pigment of the formula

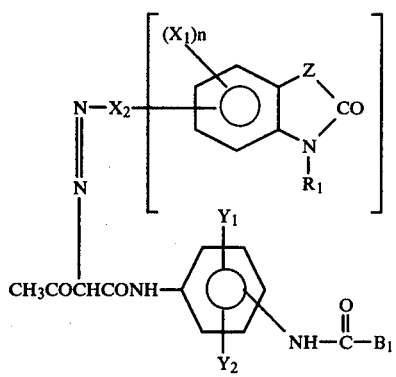 (II)

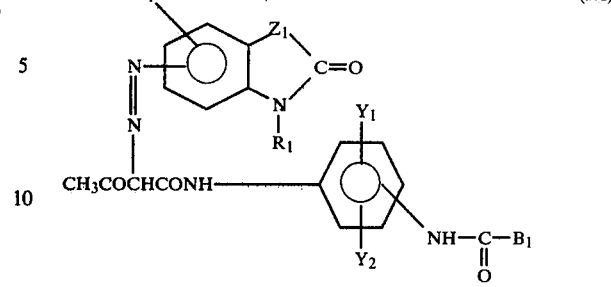 (III)

in which $Z_1$ is the NH group or the group of the formula $$-\underset{R_1}{\overset{|}{C}}=CH-$$

wherein $R_1$ is hydrogen; alkyl of 1-4 carbon atoms; or phenyl which is unsubstituted or substituted by halo, alkyl of 1-4 carbon atoms or alkoxy of 1-4 carbon atoms;

$X_1$ is hydrogen, halo, alkyl of 1-4 carbon atoms, alkoxy of 1-4 carbon atoms or phenoxy;

n is 1 or 2;

$X_2$ is a direct bond or phenylene;

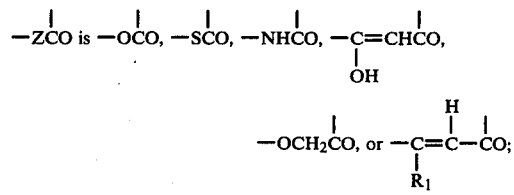

$Y_1$ is hydrogen, halo, alkyl of 1-4 carbon atoms, alkoxy of 1-4 carbon atoms or acetylamino;

$Y_2$ is hydrogen, halo, alkyl of 1-4 carbon atoms or alkoxy of 1-4 carbon atoms;

$B_1$ is hydrogen; alkyl of 1-4 carbon atoms; alkoxy of 1-4 carbon atoms; phenyl which is unsubstituted or substituted by halo, alkyl of 1-4 carbon atoms or alkoxy of 1-4 carbon atoms; phenoxy; or a group of the formula —NHQ wherein Q is hydrogen, alkyl of 1-6 carbon atoms, or phenyl which is unsubstituted or substituted by halo, alkyl of 1-4 carbon atoms or alkoxy of 1-4 carbon atoms.

2. A monoazo pigment according to claim 1, of the formula

3. A monoazo pigment according to claim 2, in which the group —NHCOB$_1$ is in the m-position or p-position relative to the acetoacetylamino group.

4. A monoazo pigment according to claim 2, of the formula

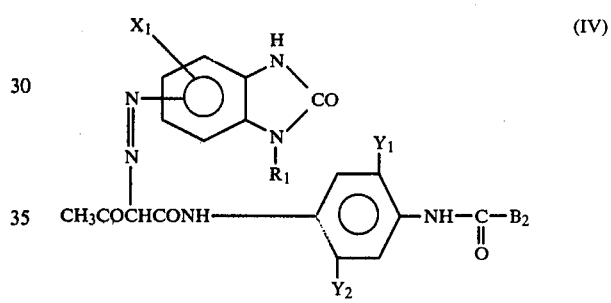 (IV)

in which $B_2$ is $C_1$-$C_3$-alkyl.

5. A monoazo pigment according to claim 4, of the formula

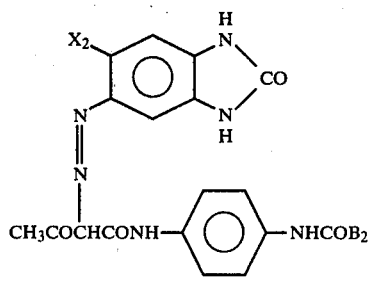

in which $B_2$ is $C_1$-$C_3$-alkyl and $X_2$ is H, Cl, $CH_3$ or $OCH_3$.

* * * * *